(No Model.)
J. W. GILL.
FEED RACK.
No. 418,006. Patented Dec. 24, 1889.
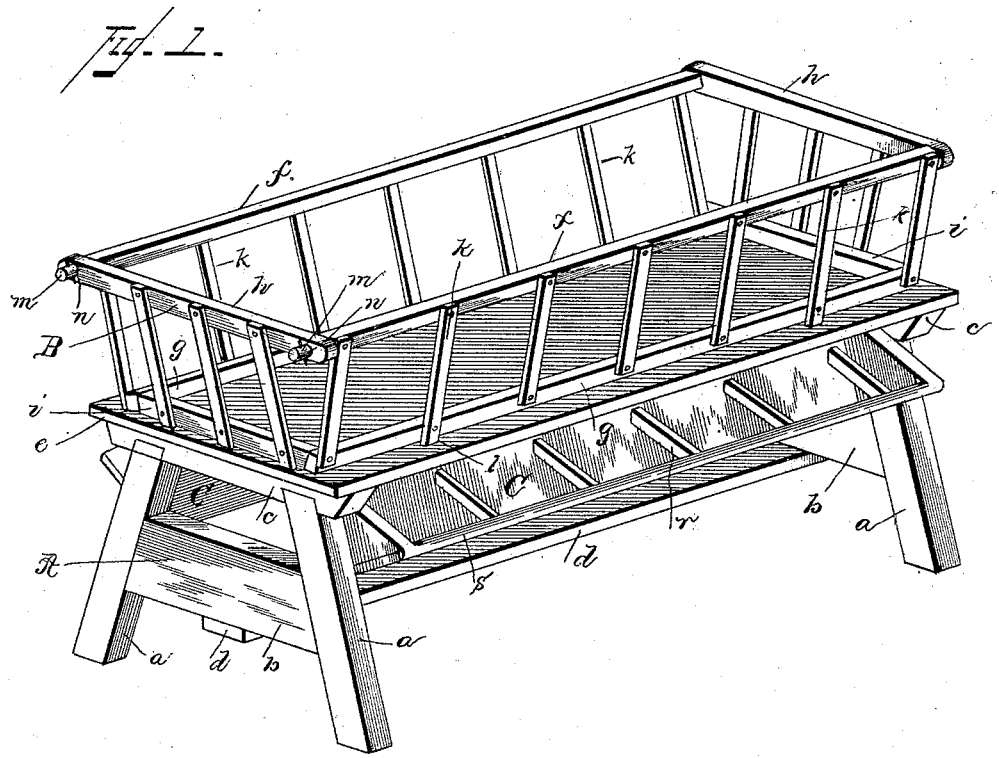
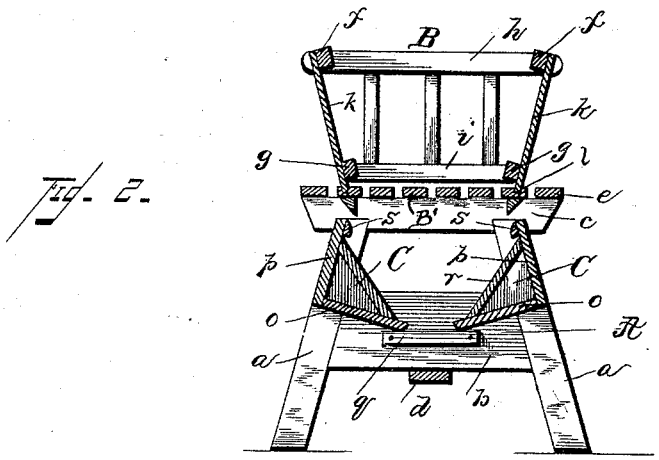
Witnesses:
F. L. Durand
L. P. Chisholm
Inventor:
James W. Gill,
By his Attorneys

UNITED STATES PATENT OFFICE.

JAMES W. GILL, OF FAIRVIEW, OHIO.

FEED-RACK.

SPECIFICATION forming part of Letters Patent No. 418,006, dated December 24, 1889.

Application filed August 27, 1889. Serial No. 322,082. (No model.)

*To all whom it may concern:*

Be it known that I, JAMES W. GILL, a citizen of the United States, and a resident of Fairview, in the county of Guernsey and State of Ohio, have invented certain new and useful Improvements in Feed-Racks for Sheep; and I do hereby declare that the following is a full, clear, and exact description of the invention, which will enable others skilled in the art to which it appertains to make and use the same.

This invention relates to improvements in feed-racks for sheep, and has for its object to combine in one device facilities for feeding hay, grain, and roots, and, if desired, for watering the flock. I attain this object by the device illustrated in the accompanying drawings, in which—

Figure 1 is a perspective view of the rack with the troughs turned out, and Fig. 2 is a cross-section of the same with the troughs turned in.

Like letters of reference denote corresponding parts in both the figures.

The letter A designates the frame having, preferably, spreading legs $a$, cross-braces $b$, cross-bar $c$, and a longitudinal brace $d$. The boarding, which forms the bottom $e$ of the hay-rack B, may be of narrow strips B′, with intervening spaces, as shown at Fig. 2, or may form a close floor, as shown in Fig. 1. The sides and ends of the rack are made with upper and lower strips $f$ $g$ $h$ $i$, respectively, to which are fastened series of slats for the sheep to feed through. Near each end of the strips $f$ $g$ a slat $k$ is prolonged and enters mortises $l$ in the bottom $e$. The ends of the strips $f$ form cylindrical tenons $m$, which fit mortises $n$ in the strips $h$. The mortises $l$ enter the bottom $e$ at an angle, so that the rack is wider at the top than at the bottom. The end sections also slant, so that the rack is longer at the top than at the bottom. In setting up the rack the end sections are first fastened to the side sections by placing the tenons $m$ in their respective mortises $n$ and pinning them on in the usual way. The bottom strips $i$ fall in between the strips $g$, and the slats $k$ are inserted in the mortises $l$. The sides thus mutually support and brace each other, and the strips $i$ strike the bottom $e$ and prevent strain being brought on the mortises $n$. Under the bottom $e$ is hinged, on each side between the legs $a$, troughs C, the side pieces $o$ and $p$ of which form approximately a right angle in cross-section. When these troughs are turned in, as shown in Fig. 2, the bottom or back piece $o$ strikes and rests on stops $q$, nailed to the braces $b$ at such a height that said piece $o$ slants downward, so that water or refuse from roots will drop out. When the troughs are swung out, as shown in Fig. 1, the edge of the back piece $o$ strikes the bottom $e$ and holds the trough so that the front piece $p$ slants downwardly toward the apex of the angle formed by the pieces $o$ and $p$. The troughs are provided with slats $r$, arranged at convenient distances apart to keep the sheep from crowding. A strip or molding $s$ is placed at the edge of the front piece $p$, which prevents the grain or roots being poked out by the sheep and thus wasted.

Although the troughs C are intended, primarily, for the purpose of feeding the sheep grain and roots—such as beets, turnips, and the like—yet it can be made tight and used for a water-trough with equal advantage. In cold weather, when the flock have drunk, any remaining water can be removed by simply tipping the troughs inward, and thus freezing is prevented. It will also be found advantageous in other respects to have these troughs hinged, as they can then be turned in when not in use, preventing the sheep from getting their feet into them, and when dirt or refuse get into the troughs they can be emptied out in a moment.

Having thus described my invention, I claim and desire to secure by Letters Patent of the United States—

In a feed-rack, the combination, with the supporting-frame A and the hay-rack mounted thereon, the bottom of which is composed of the strips B′ with intervening spaces between them, of the feed-troughs C, hinged to the legs $a$, said troughs consisting of the side pieces $o$ and $p$, slats $r$, and the molding $s$, secured to piece $p$, and the stops $q$, secured to braces $b$, substantially as described.

In testimony that I claim the foregoing as my own I have hereunto affixed my signature in presence of two witnesses.

JAMES W. GILL.

Witnesses:
D. C. KENNON,
ELLSWORTH HUNT.